United States Patent
Kunz

(10) Patent No.: US 7,095,611 B2
(45) Date of Patent: Aug. 22, 2006

(54) HOUSING FOR A PASSIVELY COOLED COMPUTER

(75) Inventor: Felix Kunz, Oberdorf (CH)

(73) Assignee: Digital-Logic AG, Luterbach (CH)

( * ) Notice: Subject to any disclaimer, the term of this patent is extended or adjusted under 35 U.S.C. 154(b) by 122 days.

(21) Appl. No.: 10/503,377

(22) PCT Filed: Jan. 31, 2003

(86) PCT No.: PCT/CH03/00078

§ 371 (c)(1),
(2), (4) Date: Aug. 3, 2004

(87) PCT Pub. No.: WO03/067407

PCT Pub. Date: Aug. 14, 2003

(65) Prior Publication Data

US 2005/0078448 A1   Apr. 14, 2005

(30) Foreign Application Priority Data

Feb. 4, 2002   (EP) .................................. 02405074

(51) Int. Cl.
*H05K 7/20* (2006.01)

(52) U.S. Cl. ....................... 361/687; 361/679; 361/690; 165/80.3; 165/185; 174/16.3

(58) Field of Classification Search ................ 361/679, 361/683, 687, 690, 697, 702, 703, 704, 707, 361/709, 714, 719; 312/223.21, 223.3; 165/80.3, 165/185, 80.2, 80.4; 174/16.1, 16.3, 252, 174/50.5, 50.51, 50.54, 35 R, 35 GC See application file for complete search history.

(56) References Cited

U.S. PATENT DOCUMENTS

| | | | | |
|---|---|---|---|---|
| 4,557,225 A | * | 12/1985 | Sagues et al. | 123/41.31 |
| 4,771,365 A | * | 9/1988 | Cichocki et al. | 361/705 |
| 5,440,450 A | * | 8/1995 | Lau et al. | 361/695 |
| 5,671,120 A | | 9/1997 | Kikinisi | |
| 6,065,530 A | * | 5/2000 | Austin et al. | 165/80.3 |
| 6,212,644 B1 | | 4/2001 | Shimoda et al. | |
| 6,304,459 B1 | * | 10/2001 | Toyosato et al. | 361/681 |
| 6,333,847 B1 | * | 12/2001 | Katsui et al. | 361/679 |
| 6,552,899 B1 | * | 4/2003 | Ronzani et al. | 361/687 |
| 6,680,849 B1 | * | 1/2004 | Atkinson et al. | 361/719 |
| 6,958,905 B1 | * | 10/2005 | Hong et al. | 361/687 |

FOREIGN PATENT DOCUMENTS

DE   27 57 282 A   7/1979

OTHER PUBLICATIONS

WO 00/46656, A Cooling System for Integrated Circuit Chips in Portable Computers, Publication Date: Aug. 10, 2000.
"Segmented Cooling for Personal Computers", IBM Technical Disclosure Bulletin, IBM Corp. New York, US, vol. 36, No. 10, Oct. 1, 1993, pp. 431-433.

* cited by examiner

*Primary Examiner*—Michael Datskovskiy
(74) *Attorney, Agent, or Firm*—Rankin, Hill, Porter & Clark LLP

(57) ABSTRACT

A housing (1) for a passively cooled computer (2), which is to be accommodated in the housing, the housing (1) including:
 a housing cover (3) and a housing floor (4), whereby at least the housing cover (3) includes a passive cooling member (3a), and
 an insulator member (5) arranged between the housing cover (3) and the housing floor (4) to prevent a thermal flow between the housing cover (3) and the housing floor (4).

13 Claims, 3 Drawing Sheets

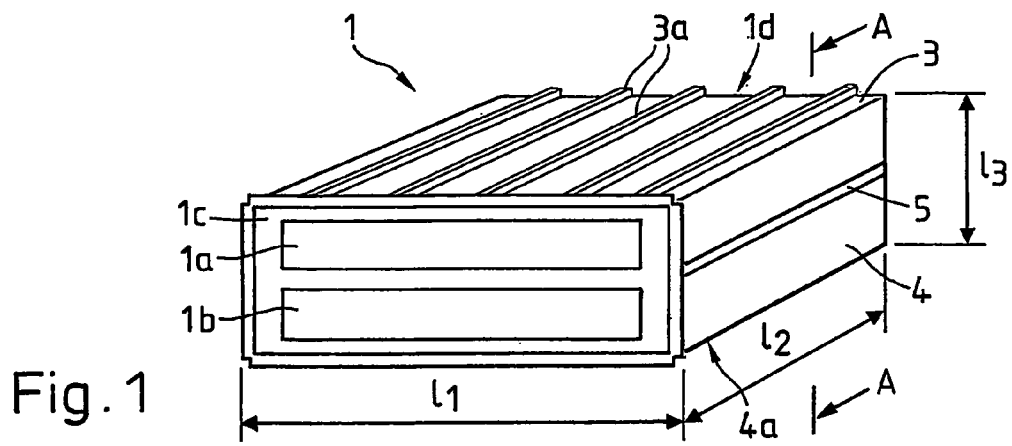
Fig.1
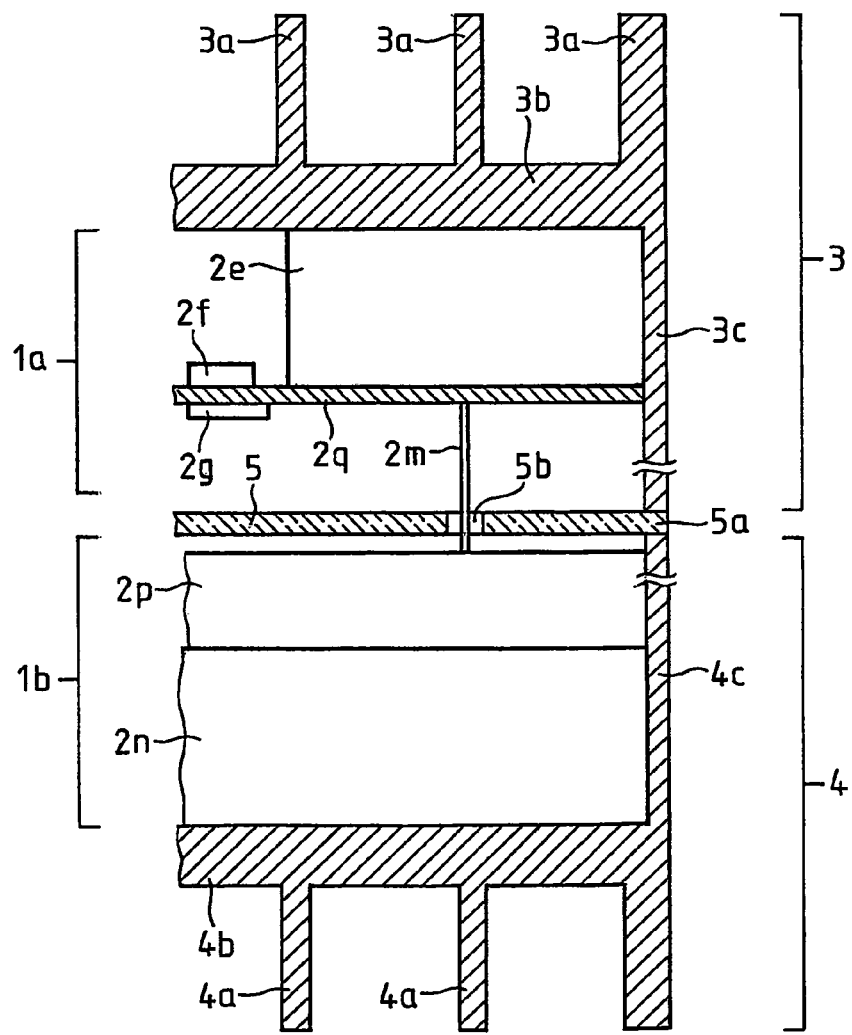
Fig.2 (A-A)

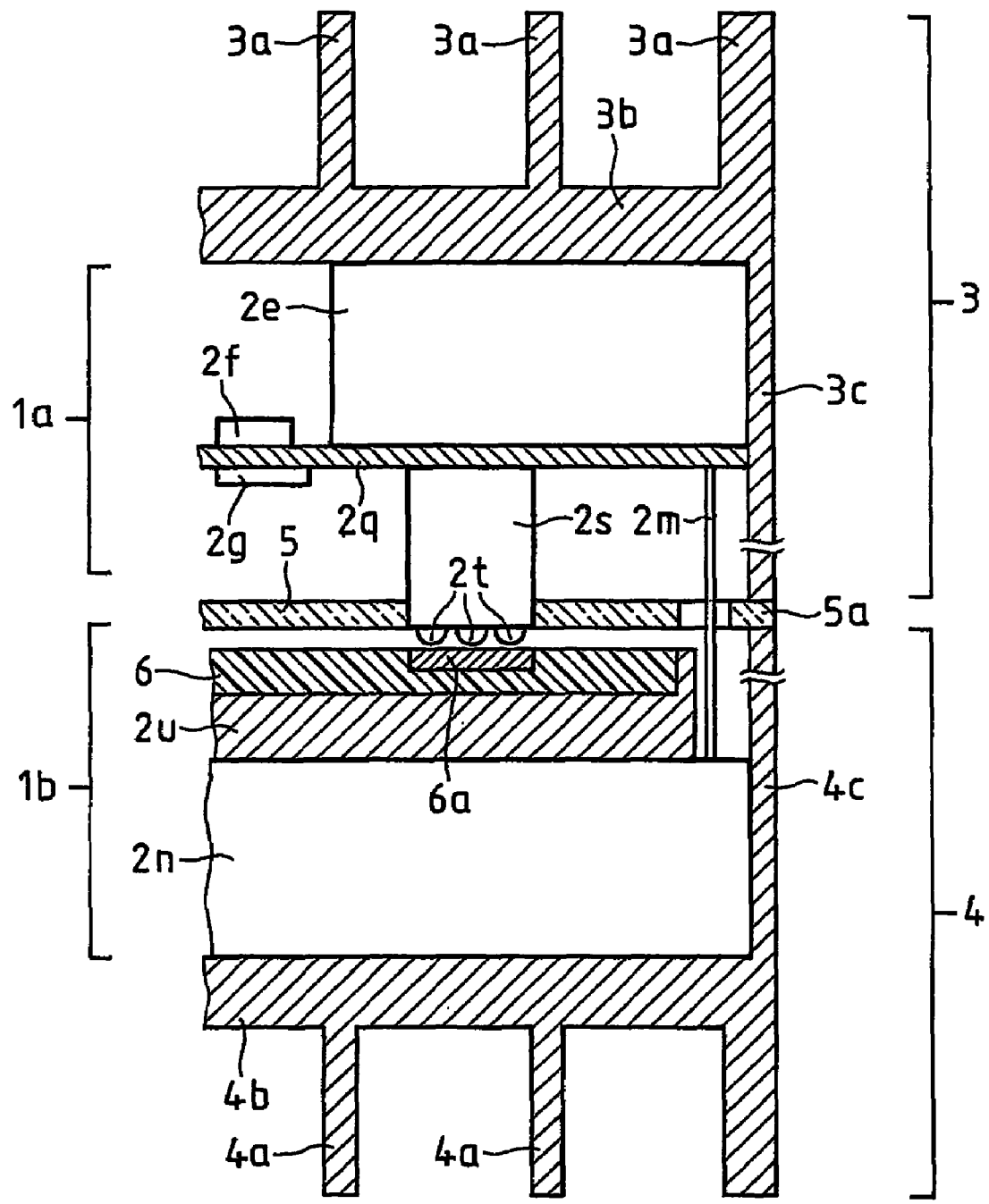
Fig. 5 (A-A)

HOUSING FOR A PASSIVELY COOLED COMPUTER

BACKGROUND OF THE INVENTION

The invention is directed to a housing for a passively cooled computer and to a computer arranged in this housing.

Due to the development of heat of their components, computers, for example personal computers, are equipped with cooling measures. Especially heat-critical modules like the microprocessor module, the drives, the power supply assembly and expansion assemblies, are actively cooled by one or more fans.

The fans that are utilized, however, are accompanied by certain disadvantages. Due to mechanical wear and the possibility of the rotating parts becoming blocked, there is always a considerable outage risk. Further, the fans provided in the computer require additional space, as a result whereof the computer housing becomes quite large. Finally, one disadvantage in the employment of motor-driven fans for cooling in the computer is that a considerable noise level is produced.

SUMMARY OF THE INVENTION

The invention is therefore based on the object of specifying measures for a housing for a passively cooled computer to cool the computer accommodated in the housing, in particular a small housing, and to minimize the noise level.

These objects are in particular satisfied by a housing for a passively cooled computer, accommodated in the housing, the housing comprising:

a housing cover and a housing floor, whereby at least the housing cover comprises a passive cooling member, and an insulator member arranged between the housing cover and the housing floor to prevent a thermal flow between the housing cover and the housing floor.

The housing comprising the features of the invention effects a passive cooling of the computer by thermal conduction. The housing comprising a housing cover and a housing floor and an insulator member to block a thermal flow between the housing cover and the housing floor leads to the effect, that during operation of the computer, the housing cover has a higher temperature compared with the housing floor. The housing cover is arranged on top of the housing floor. The heat radiated by the computer causes a higher temperature within the housing cover than the housing floor. The heat of the processor is dissipated on the housing cover, without warming up the housing floor. The lifetime and reliability of a computer system is prolonged by this concept.

One preferred embodiment of the housing comprises an insulator member or partition which divides the volume of the housing in two separate compartments, a hot compartment and a cold compartment. The hot compartment is surrounded or enclosed by the housing cover and the insulator member, the cold compartment is surrounded by the housing floor and the insulator member.

In one preferred embodiment, computer elements with higher power dissipation, such as the power supply or the microprocessor, are arranged in the hot compartment of the housing, and computer elements which need to be operated at a lower temperature, such as the hard disk drive or the CD-ROM-drive, are arranged in the cold compartment, the computer elements arranged in the hot compartment and the cold compartment being connected by an electrical connector.

Compared to cooling devices currently used in PCs with one or more fans, the measures according to the invention yield critical advantages. The outage dependability is considerably enhanced since mechanical wear and blocking of rotating parts are eliminated. With respect to the noise generated by the computer, the application of the measures indicated by the invention yields a noticeable reduction of the noise level. Given the device of the invention, thus, cooling possibilities with two separate compartments, a hot compartment and a cold compartment, are utilized, that were hitherto unknown in PC and computer technology. The cooling effect is optimized in that elements with higher power dissipation are arranged in the hot compartment, and elements which need to be operated at lower temperature are arranged in the cold compartment. At least the housing cover comprises a passive cooling member, to cool the hot compartment. The microprocessor and the power supply are preferably arranged at the edge of the housing cover, that is, in close proximity to the housing cover, or in immediate contact with the housing cover, so that a direct or indirect connection with good thermal conductance, such as by a heat or transmission element, can be obtained to the passive cooling member, which is part of an outside wall of the housing.

One advantage of the invention is, that the housing can be built very small, and the computer in the housing can be passively cooled, therefore no noise is generated. The housing is especially suitable to cool a so-called a book-sized computer. Such small, book-sized computers are used for example in point of sale, banking, transportation, healthcare and telecommunications. The housing according to the invention is able to passively cool the book-sized computer.

In one preferred embodiment, the surface of the passive cooling member or the outer surface of the whole housing has a roughened or etched surface, increasing the total surface of the passive cooling member or the housing. This measure optimizes the surface for outputting heat. To further optimize the surface for outputting heat, a dark color, especially black or a color similar to black, like anthracite, is a preferred surface color.

Other preferred features and advantages of the invention will be apparent from the claims, description of the preferred embodiments and drawings.

BRIEF DESCRIPTION OF THE DRAWINGS

FIG. 1 is a perspective view of a housing;

FIG. 2 is a vertical cross-section along the line A—A through the housing of FIG. 1 containing a computer;

FIG. 5 is a vertical cross-section of a further embodiment along the line A—A through the housing of FIG. 1.

DESCRIPTION OF PREFERRED EMBODIMENTS OF THE INVENTION

Figure 3:
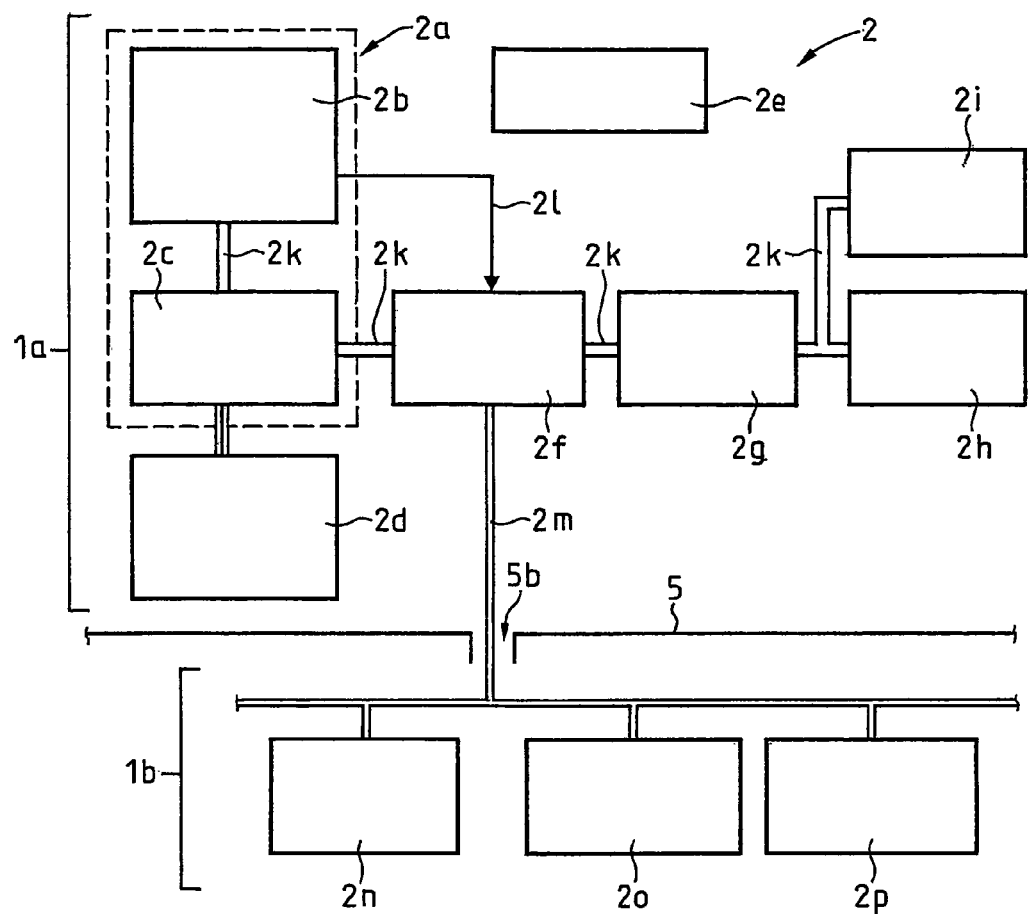
FIG. 3 is a schematic plan view of a computer, in particular a personal computer, cooled according to the invention.

FIG. 1 shows the housing 1 comprising a u-shaped housing cover 3 arranged on the top, and a u-shaped housing floor 4 arranged on the bottom. An insulator member 5 having the shape of a plate is arranged between the housing cover 3 and the housing floor 4 to prevent a thermal flow between the housing cover 3 and the housing floor 4. The insulator member 5 separates the inner space of the housing 1 in a hot compartment 1a arranged on the top, and a cold compartment 1b arranged on the bottom. A front panel 1c and a rear panel 1d are connected to the housing cover 3 and the housing floor 4, the front panel 1c and the rear panel 1d having a plurality of recesses or holes, for accommodating, for example, electrical connectors. The front panel 1c and the rear panel 1d of the housing 1 can also be part of the housing cover 3 and/or the housing floor 4. The computer electronics which radiates a significant amount of heat when in operation is arranged in the hot compartment 1a. Mass storage media, such as a hard disk or a CD-drive, which radiate relatively little heat, are arranged in the cold compartment 1b. The housing cover 3 comprises a passive cooling member 3a with outwardly projecting cooling ribs. The housing floor 4 optionally comprises a passive cooling member 4a.

Beside the rectangular shape of the housing 1 disclosed in FIG. 1, the housing cover 3 and/or the housing floor 4 may also have other shapes, for example a cylindrical shape. The housing 1 can be built in different sizes. In one preferred embodiment, the housing has a length L1 of 15 cm, a depth L2 of 15 cm and a height L3 of 7 cm. In another preferred embodiment of the invention, the bottom side of the housing 1 is the small side, as defined by L2 and L3. In this embodiment, the insulator member 5 would be parallel to the plane defined by L2 and L3.

A vertical cross-section along the line A—A of FIG. 1 is disclosed in FIG. 2. The housing cover 3 comprises a top wall 3b with projecting cooling ribs 3a and a side wall 3c. The housing floor 4 comprises a bottom wall 4b with projecting cooling ribs 4a and a side wall 4c. A plate shaped insulator member 5 is arranged between the housing cover 3 and the housing floor 4, separating the inner volume of the housing 1 into two separate compartments 1a,1b. The insulator member 5 consists of an insulating material and has a thickness of 2 mm. There is no direct contact between the housing cover 3 and the housing floor 4, but the side walls 3c, 4c of the housing cover 3 and housing floor 4 are both in touch with an edge portion 5a of the insulator member 5, preventing a significant thermal flow between the housing cover 3 and the housing floor 4. To further increase the thermal resistance between the top wall 3b or the bottom wall 4b and the insulator member 5, the thickness of the wall 3b,4b is at least three times more than the thickness of the side wall 3c,4c.

The computer electronics, for example comprising the microprocessor 2b, a graphic-chip 2g, a chipset 2f of a power supply 2e are mounted on a printed wiring board 2q. The printed wiring board 2q is arranged in the hot compartment. In order to produce a direct, thermally conductive connection from hot elements like the microprocessor module 2b or the power supply 2e, a direct connection of these elements with the inner side of the top wall 3b is provided. In the cold department 1b, a CD-drive 2p and a hard disk 2n are arranged. These elements are connected with the printed wiring board 2q by an electric connector 2m, for example built as an ISA-Bus, or any other internal computer bus. The insulator member 5 has a small opening 5b, through which the connector 2m is guided. In one preferred embodiment an additional seal is used at the opening 5b, so that no air can flow between the cold compartment 1b and the hot compartment 1a.

In one example, the electric heat generated in the hot compartment 1a by the computer electronics corresponds to about 20 Watts. The electric heat generated in the cold compartment 1b corresponds to about 10 Watts. The housing cover 3 may have a temperature of about 70° C., whereas the housing floor has a maximum temperature of about 40° C. to 50° C. Due to the thermal insulation of the hot compartment 1a versus the cold compartment 1b, there is a temperature difference of for example 20° C. there between. The expression "cold compartment" means, that the temperature in this compartment is significantly lower than the temperature in the hot compartment. Therefore, computer elements which need to be operated a lower temperature, can be arranged in the cold compartment. This concept allows arrangement of a computer 2 in a very small housing 1, and to use only passive cooling means for cooling all the elements of the computer 2.

FIG. 3 shows a schematic plan view of the computer 2, which comprises element 2a to 2p. A module 2a comprising an embedded processor module 2b and a chipset 2c, as well as the components SDRAM-Memory 2d, chipset 2f, graphic-chip 2g, LAN controller 2h, firewire 2i and power supply 2e are arranged in the hot compartment 1a. In the cold compartment 1b, separated by the insulator member 5, the hard disk 2n, an access-protection with a smart card reader 2o and a CD- or DVD-drive 2p are arranged. All elements 2a to 2p are connected by a computer bus 2k, 2m. In one embodiment, the temperature of the processor module is controlled by the signal line 2l. If the temperature exceeds a given temperature, for example 75C°, the clock rate of the processor is reduced, reducing the power consumption of the processor.

Figure 4:
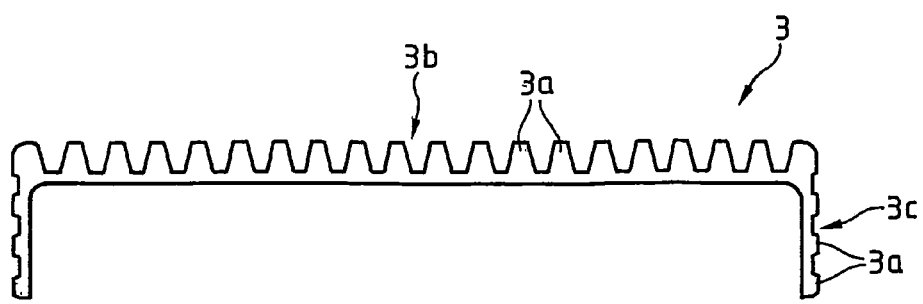
FIG. 4 is a side view of a further embodiment of a housing cover.

FIG. 4 shows a side view of a further embodiment of a housing cover 3. This housing cover 3 comprises a passive cooling member 3a consisting of a plurality of outwardly projecting cooling ribs at the top wall 3b as well as at the side wall 3c. The cooling ribs may be part of the top wall 3b. The cooling ribs may also consist of a different material than the top wall 3b. The housing 1 preferably consists of metal, for example aluminum.

To increase the surface of the passive cooling member 3a or the outer surface of the whole housing 1, the surface is roughened or etched. Such a surface structure may for example be obtained by sandblasting the surface of the housing 1. Compared with a blank surface, the roughened surface leads to an increase in surface area of about 30%. This measure increases the surface for radiating or outputting heat. To further optimize the surface for outputting heat, the passive cooling member 3a or the whole housing may have a dark color surface, especially a black color or a color similar to black, like anthracite. The color may be applied to on an aluminum housing 1 for example by anodic oxidation.

The computer 2 disclosed in FIG. 3 is working as a personal computer and is, for example, 100% compatible to a X86 system or another established standard computer system. All peripheral connectors are located on the rear side 1d. The peripheral devices are connected through associated cables to the computer 2. Status indicators and switches for the operator are located on the front side 1c. The removable mass storage media 1b, like a CD, is accessible from the front side 1c.

FIG. 5 shows a further embodiment of a vertical cross-section along the line A—A of FIG. 1. In contrast to the embodiment disclosed in FIG. 2, this embodiment comprises a smart card reader. In the embodiment according to FIG. 5, the insulator member 5 has a further opening, through which a reading head 2s comprising contact elements 2t projects. The reading head 2s is mounted onto the printed wiring board 2q. In the cold compartment 1b, a holder 2*u* for the smart card 6 is arranged. The holder 2*u* defines the final position of the smart card 6 after insertion, in which contact elements of a chip 6*a* of the card get in contact with the contact elements 2*t*. The advantage of this embodiment is, that the smart card 6 is arranged on the cold side 1*b*, which prolongs the lifetime of the smart card 6, and that the electronics of the smart card reader 2*o* are arranged on the printed wiring board 2*q*, which results in an improved access protection. The smart card reader 2*o* comprises two parts, one part, for example the holder 2*u*, being arranged in the cold side 1*b*, and other parts, like the reading head 2*s* and further electronic chips being arranged on the hot side 1*a*.

The invention claimed is:

1. A computer arranged in a housing (1), the housing (1) comprising:
    a housing cover (3) and a housing floor (4), wherein at least the housing cover (3) comprises a passive cooling member (3*a*), and the housing cover (3) is arranged to be on top of the housing floor (4) during operation of the computer, and
    an insulator member (5) is arranged between the housing cover (3) and the housing floor (4) to prevent a thermal flow between the housing cover (3) and the housing floor (4), and
    the computer is arranged to be passively cooled through the passive cooling member (3*a*), wherein the insulator member (5) divides a volume of the housing (1) in two separate compartments (1*a*, 1*b*), a hot compartment (1*a*) and a cold compartment (1*b*).

2. The computer according to claim 1, wherein the cold compartment is surrounded by the housing floor and the insulating member and the housing floor (4) comprises a passive cooling member (4*a*).

3. The computer according to claim 1, wherein the housing cover (3) and the housing floor (4) consists of metal, in particular aluminum.

4. The computer according to claim 1, wherein the housing cover (3) comprises a top wall (3*b*) and a sidewall (3*c*), and/or the housing floor (4) comprises a bottom wall (4*b*) and a sidewall (4*c*), and wherein a thickness of at least one of the top wall (3*b*) and the bottom wall (4*b*) being at least three times a thickness of the sidewall (3*c*,4*c*).

5. The computer according to claim 1, wherein the passive cooling element (3*a*) comprises outwardly projecting cooling ribs.

6. The computer according to claim 1, wherein the housing cover (3) and the housing floor (4) have a u-shape.

7. The computer according to claim 1, wherein the passive cooling member (3*a*) has a rough outer surface improving thermal dissipation.

8. The computer according to claim 1, wherein the passive cooling member (3*a*) has an outer surface with a dark color like black or anthracite.

9. The computer according to claim 1, wherein computer elements with higher power dissipation, such as a power supply or a microprocessor, are arranged in the hot compartment (1*a*) of the housing (1), and computer elements which need to be operated at lower temperature, such as a hard disk drive or a CD-ROM-drive, are arranged in the cold compartment (1*b*).

10. The computer according to claim 1, wherein the computer comprises a sensor to measure a temperature in the hot compartment (1*a*), the sensor being connected to a control unit, whereby the control unit controls performance of the computer, in particular the processor's performance, depending on the measured temperature.

11. The computer according to claim 1, wherein the computer comprises a smart card reader (2*o*) and wherein some of the parts of the smart card reader (2*o*) are arranged in the hot compartment (1*a*) and some other parts of the smart card reader are arranged in the cold compartment (1*b*).

12. The computer according to claim 11, wherein a holder (2*u*) for a smart card (6) is arranged in the cold compartment (1*b*), and wherein electronics of the smart card reader (2*o*) is arranged in the hot compartment (1*a*).

13. The computer according to claim 1, wherein at least one computer element with a higher power dissipation is arranged to have a thermally conducting connection with the housing cover (3).

* * * * *